US012792612B2

(12) United States Patent
Leslie et al.

(10) Patent No.: US 12,792,612 B2
(45) Date of Patent: Nov. 10, 2026

(54) SYSTEMS AND METHODS FOR ACTIVITY-RELATED QUERY-RESPONSE PROCESSING

(71) Applicant: Pelmorex Corp., Oakville (CA)

(72) Inventors: Donald Alexander Leslie, Oakville (CA); Gerard Doyle, Burlington (CA)

(73) Assignee: Pelmorex Corp., Oakville (CA)

( * ) Notice: Subject to any disclaimer, the term of this patent is extended or adjusted under 35 U.S.C. 154(b) by 0 days.

(21) Appl. No.: 18/804,373

(22) Filed: Aug. 14, 2024

(65) Prior Publication Data

US 2025/0061116 A1 Feb. 20, 2025

Related U.S. Application Data

(60) Provisional application No. 63/519,506, filed on Aug. 14, 2023.

(51) Int. Cl.
*G06F 17/00* (2019.01)
*G06F 16/2457* (2019.01)

(52) U.S. Cl.
CPC .............................. *G06F 16/24575* (2019.01)

(58) Field of Classification Search
CPC ................................................ G06F 16/24575
See application file for complete search history.

(56) References Cited

U.S. PATENT DOCUMENTS

| | | | | |
|---|---|---|---|---|
| 10,783,876 | B1 * | 9/2020 | Hoover | G10L 15/1815 |
| 11,875,240 | B1 * | 1/2024 | Bosnjakovic | G06N 3/045 |
| 2015/0160806 | A1 * | 6/2015 | Fey | G06F 3/0484<br>715/748 |
| 2016/0125751 | A1 * | 5/2016 | Barker | G16H 40/20<br>434/322 |
| 2017/0013047 | A1 * | 1/2017 | Hubbard | H04L 67/535 |
| 2017/0091191 | A1 * | 3/2017 | Alba | G06F 16/243 |
| 2018/0285444 | A1 * | 10/2018 | Joshi | G06F 16/435 |
| 2021/0011920 | A1 * | 1/2021 | Sudarsan | G06F 16/24575 |

OTHER PUBLICATIONS

Srishti Palani et al., InterWeave: Presenting Search Suggestions in Context Scaffolds Information Search and Synthesis. In Proceedings of the 35th Annual ACM Symposium on User Interface Software and Technology. Asso. for Computing Machinery, Article 93, 1-16. <https://doi.org/10.1145/3526113.3545> Oct (Year: 2022).*

* cited by examiner

*Primary Examiner* — Greta L Robinson
(74) *Attorney, Agent, or Firm* — Marks & Clerk

(57) ABSTRACT

Systems and methods for generating natural language responses to user queries in which the response may be influenced by weather, climate, environmental or similar factors. The system includes an input/output module for inputting and outputting natural language queries and responses, a pre-processor to extract information from free-text queries to assemble a further query, a generator for generating responses, a post-processor to process responses for quality. Helper modules and other data sources may also be provided to augment queries and responses.

21 Claims, 5 Drawing Sheets

SYSTEMS AND METHODS FOR ACTIVITY-RELATED QUERY-RESPONSE PROCESSING

CROSS-REFERENCE TO RELATED APPLICATION

This application claims the benefit of U.S. Provisional Patent Application No. 63/519,506, entitled SYSTEMS AND METHODS FOR ACTIVITY-RELATED QUERY-RESPONSE PROCESSING, filed Aug. 14, 2023, the entire contents of which are hereby incorporated by this reference.

TECHNICAL FIELD

The disclosed exemplary embodiments relate to computer-implemented systems and methods for generating and providing natural language responses to queries and, in particular, to systems and methods that provide natural language responses to freetext queries.

BACKGROUND

Weather, climate and other environmental conditions play an important role in our daily lives, impacting numerous aspects of our activities, such as outdoor events, travel and commuting, agricultural practices, construction, emergency preparedness, and more.

Various agencies generate and provide forecasts, current conditions and historical data of atmospheric and other climate and environmental conditions, including temperature, barometric pressure, humidity, air quality, smoke, pollen, allergens, insects or other pests, wind speed, gusts and direction, probability and type of precipitation, rain and snow accumulations, wave height/frequency and water temperature, water currents and tides, and other relevant meteorological and marine variables, over a specific location and time period. For instance, weather reports are generated by meteorological agencies and organizations that utilize advanced weather monitoring systems, satellites, and computational models to analyze, predict and record weather patterns.

Traditionally, such reports were disseminated through various means, such as newspapers, radio broadcasts, and television channels. With the advent of the internet and digital technologies, weather information is now readily available through websites, mobile applications, and even through voice-activated virtual assistants. This accessibility has significantly enhanced the convenience and reach of such reports to individuals across the globe.

Despite the advances in forecasting technologies and their dissemination, weather users often have a planning question in mind upon which weather is an influencing factor. However, it still may be challenging for users to obtain weather, climate and other environmental information in a form that is easily digestible and understandable to them and which directly answers the specific questions they have in mind when they access weather. It may be equally challenging for them to obtain only the most relevant information to their specific needs.

SUMMARY

The following summary is intended to introduce the reader to various aspects of the detailed description, but not to define or delimit any invention.

In at least one broad aspect, there is provided an automated system for responding to queries in which a response is influenced by weather, climate or environmental factors, the system comprising: a memory; a processor operative coupled to the memory, the processor configured to: receive a freetext query; pre-process the freetext query to extract at least a data entity and use the data entity to generate an assembled query; generate, using a generator, a pre-response based on the assembled query; and transmit the pre-response to an output device.

In another broad aspect, there is provided a method of responding to user queries in which a response is influenced by weather, climate or environmental factors, the method comprising: receiving a freetext query; pre-processing the freetext query to extract at least a data entity and use the data entity to generate an assembled query; generating a pre-response based on the assembled query; and transmitting the pre-response to an output device.

In some cases, the method further comprises post-processing, or the processor is further configured to post-process, the pre-response to generate a response.

In some cases, the method further comprises, or the processor is further configured to select, at least one pipeline from a plurality of pipelines based on an optimization function.

In some cases, the optimization function considers at least one of speed, quality and cost. In some cases, the at least one pipeline includes at least one machine learning model.

In some cases, the optimization function selects at least one machine learning model, the pre-response is generated by processing the assembled query using the at least one machine learning model.

In some cases, at least one generator comprises a plurality of pipelines, the pre-response comprises a plurality of pre-responses each generated by respective pipelines of the plurality of pipelines, and the post-processing comprises selecting at least one of the plurality of pre-responses to generate the user response.

In some cases, pre-processing the freetext query comprises classifying the freetext query into a selected predefined inquiry type of a plurality of predefined inquiry types, and the plurality of predefined inquiry types is finite.

In some cases, the classifying is performed by a classifier machine learning model. In some cases, the classifying is performed via clustering using a nearest neighbour matching algorithm. The classifying may be performed using a classifier machine learning model.

In some cases, generating the assembled query comprises transmitting the freetext query to a helper module and receiving the data entity, wherein the helper module processes the freetext query to extract the data entity.

In some cases, generating the assembled query comprises assembling a plurality of sub-elements.

In some cases, the plurality of sub-elements include at least one of contextual data, classification and the user profile information.

In some cases, the contextual information is a preamble or a postscript. In some cases, the contextual information includes a persona. In some cases, the contextual information includes one or more examples of queries associated with the freetext query. In some cases, the contextual information includes at least one of weather, climate, and environmental information drawn from internal and external sources. In some cases, the contextual information includes user profile information associated with the freetext query. In some cases, the contextual information includes location information relevant to the freetext query. In some cases, the contextual information includes activity information. In some cases, the contextual information includes a recommended tone or style. In some cases, the contextual information is dynamically selected using a contextualization machine learning model. In some cases, the contextual information includes a unique identifier associated with a user.

In some cases, pre-processing the freetext query further comprises extracting one or more data field entities from the freetext query.

In some cases, a user profile is obtained from contextual data associated with the freetext query. In some cases, the user profile is updated based on the contextual data.

In some cases, the assembled query is further generated based on the contextual information.

In some cases, the one or more data field entities are selected from the group consisting of: user profile, contextual weather-related data, location data, activity-related data, day of the year, day of the week, and local/national holiday info.

In some cases, the at least one machine learning model is at least one large language model.

In some cases, the post-processing comprises determining a response quality. In some cases, the response quality is determined based on at least one of a plurality of quality factors, wherein the plurality of quality factors include relevance, completeness and appropriateness, and accuracy of any facts stated in the response.

In some cases, the system further comprises a display, and the processor is further configured to generate a user interface for display on the display, and the processor is further configured to generate a suggested query for display in the user interface.

In some cases, the suggested query is based on a text embedding.

In some cases, the method further comprises selecting at least one pipeline from a plurality of pipelines based on an optimization function.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

The described embodiments generally provide a conversational question answering system capable of delivering—at or near real-time—natural language responses to a wide variety of user queries in which the response may be influenced by weather, climate, environmental (land, marine, atmospheric and/or astronomical) or similar factors over historical, current and forecast time periods.

Figure 1:
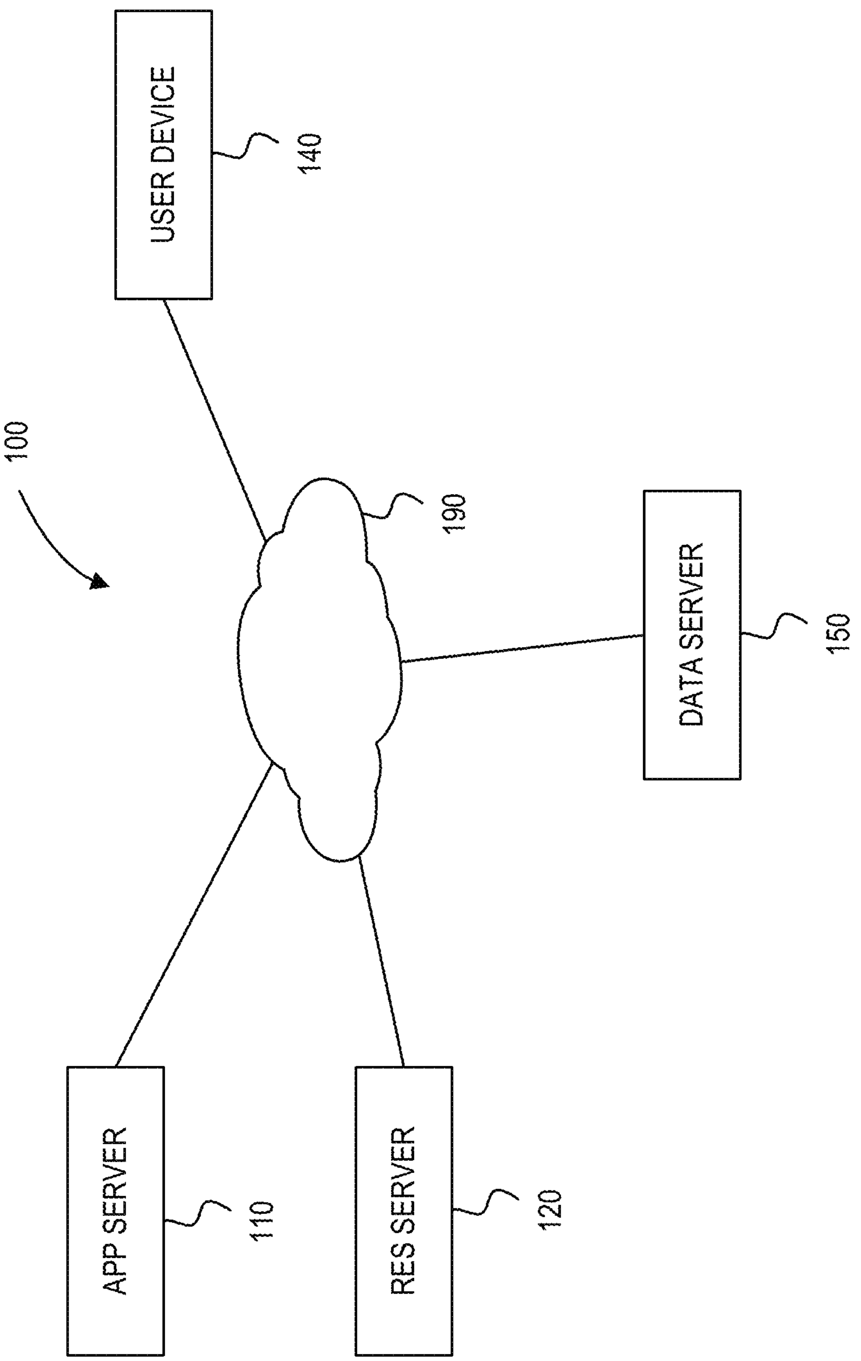
FIG. 1 is a schematic block diagram of a computing system in accordance with at least some embodiments.

Referring now to FIG. 1, there is illustrated a block diagram of an example computing system, in accordance with at least some embodiments. Computing system 100 has at least one application server 110, at least one resource server 120, at least one data server 150, and at least one user computing device 140, each of which is operatively coupled to a network 190, and thereby to each other. Network 190 may be a public network, such as the internet, or a private or virtual private network, or a mixture of the foregoing. In general, an application server 110 handles interaction with a user or external programmatic interface, while a resource server 120 handles processing of queries. However, in at least some embodiments, application servers 110 and resource server 120 may be interchangeable, with each being capable of performing the functionality of the other. For example, an application server 110 may provide both user interface functionality and query processing functionality.

Figure 2:
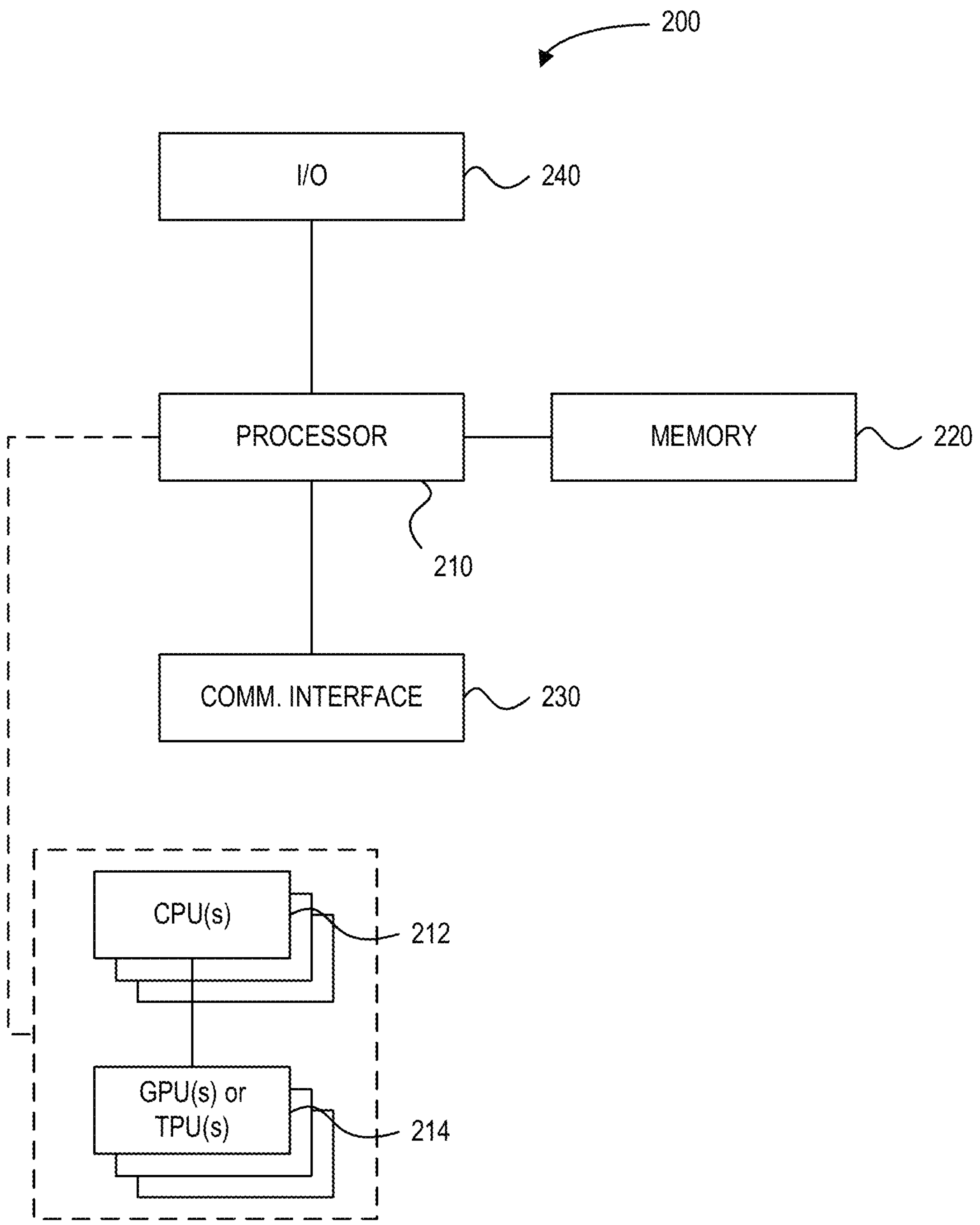
FIG. 2 is a block diagram of a computer in accordance with at least some embodiments.

Referring now to FIG. 2, there is illustrated a simplified block diagram of a computer in accordance with at least some embodiments. Computer 200 is an example implementation of a computer such as application server 110, resource server 120, data server 150 or user device 140 of FIG. 1. Computer 200 has at least one processor 210 operatively coupled to at least one memory 220, at least one communications interface 230 (also herein called a network interface), and at least one input/output device 240.

The at least one memory 220 includes a volatile memory that stores instructions executed or executable by processor 210, and input and output data used or generated during execution of the instructions. Memory 220 may also include non-volatile memory used to store input and/or output data along with program code containing executable instructions.

Processor 210 may transmit or receive data via communications interface 230, and may also transmit or receive data via any additional input/output device 240 as appropriate.

In some cases, the processor 210 includes a system of central processing units (CPUs) 212. In some other cases, the processor includes a system of one or more CPUs 212 in combination with one or more processing units capable of high performance vector or floating point processing, such as Graphical Processing Units (GPUs) or Tensor Processing Units (TPUs) 214 that are coupled together. For example, the application server 110 or resource server 120 may execute machine learning model computations on CPU and GPU/TPU hardware, such as the system of CPUs 212 and GPUs/TPUs 214.

Figure 3:
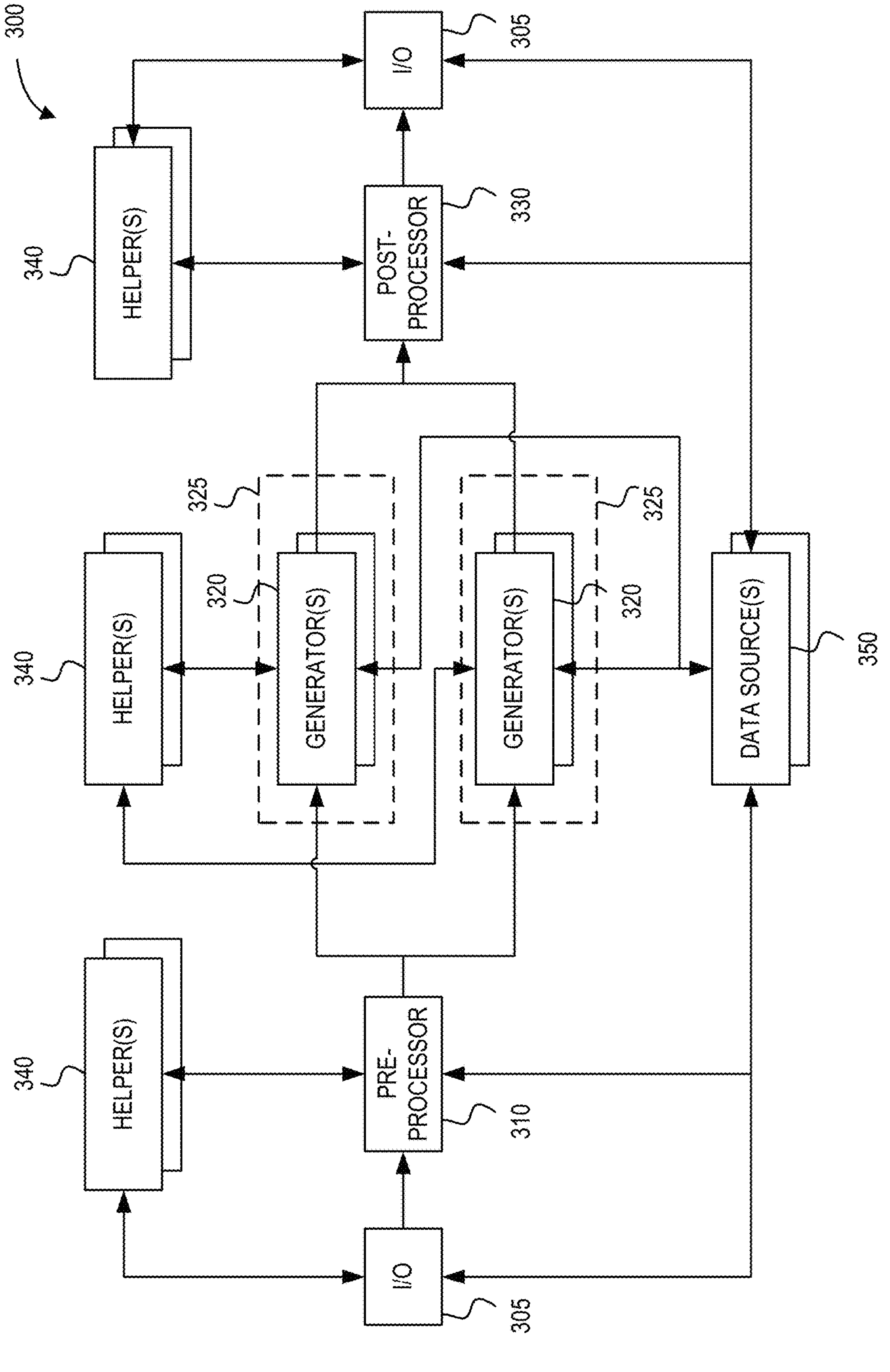
FIG. 3 is a logical block diagram of an automated system for responding to queries in accordance with at least some embodiments.

Referring now to FIG. 3, there is shown a logical block diagram of an automated system for responding to user queries in which a response is influenced by weather, climate, environmental (both land and marine) or similar factors over historical, current and forecast time periods. The logical components of system 300 include an input/output module 305, pre-processor 310, one or more generator 320 (each of which may be part of a pipeline 325), a post-processor 330, one or more helper module 340, and one or more data source 350.

System 300 can be implemented by the components of computing system 100, and the specific functionality of the components of system 300 may be provided by the elements of system 100 in a variety of ways.

For example, at least one data source 350 may be implemented by a data server 150 of system 100.

In some embodiments, an application server 110 of system 100 may implement the functionality of input/output module 305, pre-processor 310, generator 320 (and pipeline 325), post-processor 330 and even one or more helper module 340 and one or more data source 350.

In other embodiments, an application server 110 of system 100 may co-operate with a resource server 120 to implement the functionality of input/output module 305, pre-processor 310, generator 320 (and pipeline 325), post-processor 330 and even one or more helper module 340 and one or more data source 350. For instance, application server 110 may implement the functionality of input/output module 305, pre-processor 310 and post-processor 330, while resource server 120 may implement the functionality of generator 320.

Generally, input/output module 305 provides a user and/or programmatic interface that accepts a query, e.g., directly from a user, or programmatically from another system that may pre-populate the user query for the user, and transmits the query to the pre-processor 310. The user interface also displays user responses generated by the system as described further herein.

The user interface may be provided by, e.g., a web server that serves web pages for display in a web browser, or which provides an application programming interface for use by a client application. Accordingly, the user interface may provide for use across a wide variety of platforms including but not limited to personal computers, laptops, web, mobile web, mobile phone app, tablet app, smart television app, home automation devices, vehicle-based app, smart speakers, and the like.

The user interface may display responses that include one or more multimedia content components such as pictures, photos, maps including those displaying layers of data, videos-both proprietary and third party, links/URLs to other proprietary or third party content including articles, social media, search engine results, and infographics, diagrams, lists, tables, graphs, charts, etc., all of which can be either static or dynamic and interactive or non-interactive, and displayed together with the response in order to add more relevant context to answering the user query and substantiating the response.

Figure 5A:
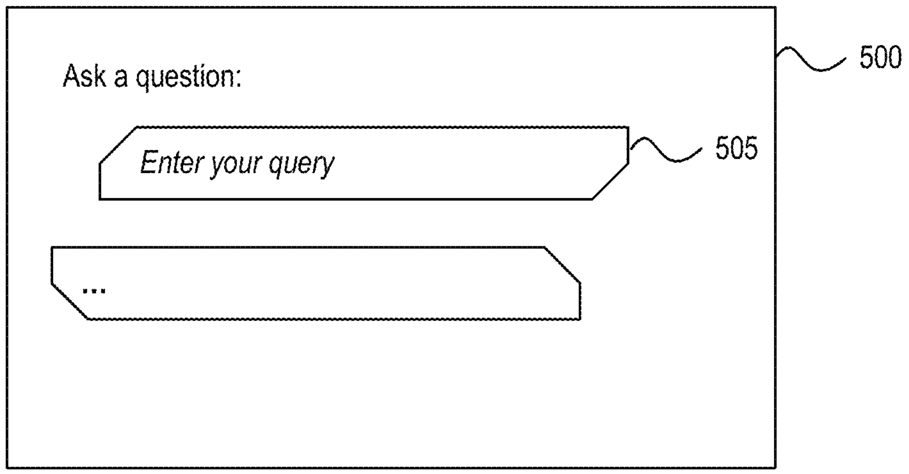
FIGS. 5A and 5B are illustrations of an example user interface in accordance with at least some embodiments.
Figure 5B:
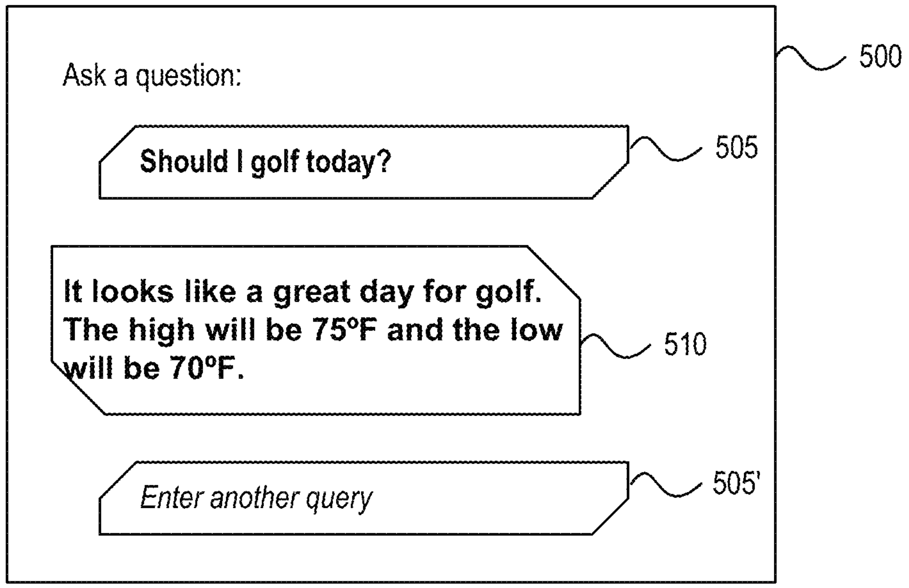

One example embodiment of a user interface is shown in FIGS. 5A and 5B. User interface 500 includes a freetext input field 505, which allows users to enter free-form questions as a freetext query, and a response field 510 for displaying responses. User interface 500 may provide a new text input field 505 following each response field 510, to enable the user to ask further questions, which may or may not relate to responses received via user interface 500.

In some cases, the user interface 500 may also provide a speech-to-text system for receiving questions, and a text and text-to-speech interface for returning and presenting the answers to the user. Alternatively, the user interface 500 may make use of the built-in speech-to-text and/or text-to-speech capabilities of the user's device.

In some cases, the user interface 500 may display one or more of a user's previous queries as a convenience to the user. Accordingly, user queries may be stored in a database in association with a user identifier for later retrieval, and additionally indexed for targeted retrieval by time of day, day of week, day of year, location from which the query was received, place to which the query relates, time period and weather condition to which the query relates, activity to which the query relates, etc.

Similarly, in some cases, the user interface 500 may display one or more of a user's most frequent queries as a convenience to the user.

Similarly, in some cases, the user interface 500 may display one or more of other users', or cohort of users similar to the user (e.g., golfers or residents of the same town/neighbourhood, etc.), most frequent queries as a convenience to the user.

Text input field 505 may be configured to determine and display a list of similar queries as a user enters their query character-by-character. The similar queries may be drawn from the user's previous queries or from all users' queries, or both.

In some cases, advertising (both display and video) may be displayed that can be targeted based on the keywords in the query and potentially based on keywords in the response as well, and based on information about the user and other context about the session such as the current time/date, their current location, the device in use, etc.

In some cases, the previous queries are populated in the text input field 505. Alternatively, once the user begins entering text in the text input field 505, the user interface displays the previous queries in a separate pop-up or pop-over field, and provides buttons for the user to press and trigger the previous queries to be submitted.

The user query database is a database of user queries designed for rapid and accurate nearest-neighbour retrieval of the most similar past queries by a user and/or by all users. This database can be implemented as a vector database of text embeddings of past queries by the individual user and queries by all other users.

In some cases, the user interface may suggest predetermined queries, based on factors including weather, climate and environmental (land, marine, atmospheric and/or astronomical) current conditions and forecasts, current user location, time/date, etc., to enable the user to receive answers to common questions without having to input a custom query of their own. Examples may include but are not limited to:

What is the current temperature?
What will the weather be like this afternoon?
Will it rain tomorrow?
What is the UV index forecast for today?
What's the forecast for the weekend?
Are there any weather warnings in effect?
What's the air quality like today?
Will local schools declare a "snow day" tomorrow?
Is there a chance of thunderstorms this evening?
What is the wind speed and direction today?
What is the humidity level today?
When is the sunrise and sunset today?
Will there be any fog tomorrow morning?
What is the pollen count today?
What is the weather forecast for the next seven days?
Is it safe for boating or beach activities today?
Will there be any snowfall in the mountains this week?
Is the weather suitable for hiking this weekend?
What will be the high and low temperatures for today?
When is the next full moon?
Is there a risk of wildfires in my area?
Is it a good day for fishing today?
Is it a good day for a picnic tomorrow?
What's the weather like at [specific location] today?

User interface 500 receives each freetext query (whether freeform as supplied by the user or predetermined as suggested by the user interface) and transmits it to pre-processor 310. Pre-processor 310 pre-processes the query to: a) classify the query type, b) determine the query data characteristics, c) determine the most appropriate one or more pipelines to use to process the query, d) determine other multimedia content or links to improve relevance and completeness of the response, to generate an assembled query (in some embodiments, this may be referred to as an "augmented query") that is further transmitted to at least one generator 320.

In some cases, pre-processor 310 may process the freetext query to determine whether the query is suitable for processing by system 300. For example, the query may be processed to determine if it is sufficiently weather-, climate- or environment-related to be accepted. In the case that it is not, the pre-processing stage may immediately generate a response that notifies the user that the query cannot be processed.

Pre-processor 310 extracts one or more data field entities from the freetext query, to determine the contextual weather/weather-related information/data being queried, data about the user asking the question, location/regional data, activity-related data or other may be desired in order to retrieve the factual data to used in responding to the query. Optionally, pre-processor 310 may classify the freetext query (either as part of the preceding screening, or separately) to aid in this determination.

In some cases, pre-processor 310 may also receive and/or determine contextual data associated with the query. For instance, contextual data may include user profile information, which may be determined based on a user login, unique identifier (e.g., Internet Protocol (IP) address, cookie, Advertising ID, etc.), session identifier, unique device identifier, or other contextual data. The user need not be registered or logged in for contextual data to be determined. In some cases, some contextual data may be received and/or determined with the assistance of one or more helper modules or data servers. Contextual data may be accumulated or aggregated over time, e.g., from the user's queries or from assembled queries of the user, either or both of which may be stored to form a query history. At least one of the helper modules may process the query history to extract contextual data.

For example, a unique identifier may associate a user to a demographic profile. This identifier may be an advertising targeting identifier or some other identifier.

Contextual data may include but is not limited to demographic/psychographic information (such as age, gender, marital status, child-in-the-home, profession, individual/family income, education, online browsing habits, observed offline/real-world behaviour patterns, etc.); predicted and observed information on the user's characteristic likelihoods and behavioural propensities (e.g., their likelihood to own a dog, or vacation internationally, be climate/environmentally-aware, etc.); the user's preferences (including but not limited to favourite or frequent activities, including sporting activities such as running, cycling, golfing, etc.); the user's weather preference/tolerance thresholds for various activities; information about the user's past queries; information about the user's devices; information about how the user prefers to be communicated with (both in terms of mode and tone and length, etc.); how frequently the user prefers to be communicated with, information that the user has shared about their health interests, concerns, issues in order to provide information to them to help them predict the effect of weather and weather-related factors on their health (such as but not limited to pollen and allergies, etc.); the user's current location; the current time where the user is asking the question; the user's likely future location based on past behaviour or a prediction based on other information or preferences of the user; other locations of declared personal interest (such as declared or observed/derived favourites); other locations of observed or derived personal interest (both observed and declared, and can be home, work, school, locations of family and friends, or other frequented locations, etc.); other locations at which the user carries on activities (such as golf courses, ski hills, etc.) based on declaration, observation or prediction; other locations at which the user could carry out specific activities (such as those that are not designated as destinations such as golf courses, ski hills, etc.); the time zone of the user; and information about how the user has rated responses to their past questions. The use of user context helps to facilitate system responses that are personalized and suited to the user's needs or preferences.

The contextual data can also include ancillary information about multiple locations and regions, including but not limited to information about fixed attractions such as golf courses, ski hills, zoos, stadiums, live theatres and performance spaces, vehicle race tracks, track-and-field sports locations, horse/animal race tracks, tennis courts, gardens and parks, art galleries, libraries, gymnasiums, pools, beaches, theme parks, and museums; temporary attractions such as festivals, parades, farmers' markets, outdoor fitness, carnivals, pop-up art events, clean-up drives, and outdoor performances and concerts; including how affected the user's enjoyment of them may be by weather, or other environmental (land, marine, atmospheric and/or astronomical) factors, accessibility information, limitations or restrictions on accessing them, etc.

Similarly, contextual data can be provided for cities or regions, or for events.

In some cases, pre-processor 310 may connect to helper modules such as third-party, partner and social media data sources of events and venues, and other contextual data. Helper modules may include helper functions for analyzing the assembled query and, optionally, the query history, to determine a) what data is required to generate a response, b) how the user query should best be structured, c) how best to process the assembled query, as well as identifying and extracting salient data entities for the assembled query, modifying the assembled query, accessing external data sources to retrieve data relevant to the assembled query, and accessing external processing functionality for the assembled query.

In some cases, helper modules are trained using a combination of manually-created training data and/or synthetic training data created by an automated system. The training data consists of a selection of manually-created questions, real user questions that have been manually-augmented with the addition of classification data for each question. This list of questions can be used to train the helper modules. It can also be used to train a system to create a large number of additional training questions similar but differing from the questions provided to it. This combination of manually-created, real user questions and synthetic questions that have been annotated with classification instructions represents the training data to create a help module that is highly accurate and highly efficient in classifying all new user questions.

For example, helper modules may be trained with the following different kinds of classification training data sets, such as, but not limited to:

- Classifying the question—Lists of manually-created and real user questions that have been annotated with the addition of a classifier—for example to classify the question into one of "Simple", "Moderate", "Hard" classifications based on whether the question can be answered: a) without weather data, b) with just weather data, or c) using much more extensive data and information and contextual understanding above and beyond just weather data, to generate a quality response. This is done to determine which is the lowest-cost pipeline that can be used to generate a response to the question.

Determining the weather data sources to be used to answer the question—Lists of manually-created and real user questions that have been annotated with the addition of a classifier that describes which of: historical, current conditions, hourly, shorter- and longer-term, climate and other weather or environmental (land, marine, atmospheric) data is to be used and for which time periods, so as to optimally provide just the data that is relevant to answering the question. This is done both to improve the ability of the system to provide the most relevant answer and not get confused or overwhelmed by superfluous data, as well as to minimize question-processing and response-generation costs.

Other helpers for tasks such as, but not limited to, determining, based on the question being asked by the user, what subset of profile information about the users would be most relevant to answering the question with high relevance, completeness and accuracy. For example, if the user asks a question about suggested activities, it would be useful to know whether the user has or is likely to have children in their home, of if a user asks a moderate-difficulty question about the weather on the weekend, it would be useful to know which sports/activities (e.g., golf, running, gardening, boating) the user typically engages in. This helper is trained with training data that has been manually and synthetically created by annotating lists of manually-created and real user questions, with the specific subset list of different demographic, psychographic and behavioural propensity factors, that would be most relevant to know, to answer each different question in the training set.

The contextual data may also include weather and weather-related information about the locations and regions of interest over a wide range of time periods and ranges, including but not limited to historical actual weather, historical norms and ranges and probabilities, current conditions, hourly forecasts, short-term forecasts, long-term forecasts, seasonal forecasts, and will include but not limited to other weather-related data (e.g., air quality, allergens, etc.), and the like.

In some cases, the pre-processor 310 may also generate a text embedding of the user's query and store the embedding along with the query. The text embedding may also be classified, e.g., via a nearest-neighbour algorithm, to analyze the query and classify it into one of a finite number of predefined question types, and/or into one or more clusters of similar or related queries based on consideration of multiple data parameters or data dimensions.

Once the data field entities, contextual data and, optionally, classification are determined, the pre-processor 310 generates the assembled query. The pre-processor 310 generates the assembled query combining sub-elements based on the freetext query. Sub-elements may be based on the data field entities, contextual data, and classification of the freetext query. In some cases, sub-elements are based on the user profile information associated with the freetext query. Some additional sub-elements may be static and predetermined. Still other sub-elements, such as a preamble sub-element, may be dynamically generated based on other sub-elements. In at least some embodiments, the original freetext query is an additional sub-element to be included in the assembled query. A postscript or suffix, which may be dynamic or static, may also form a sub-element.

Generating the assembled query based on the sub-elements associated with the freetext query enables delivery of an optimal response quality from a generator (e.g., large language model).

For example, the assembled query may incorporate sub-elements selected and customized for the following exemplary categories:

Current Weather—queries about the current weather conditions (may include a tailored preamble and sub-elements based on data fields and contextual data such as location);

Weather Forecast—queries about future weather conditions (may include a tailored preamble and sub-elements based on data fields such as location and contextual data such as locations the user frequently asks about);

Historical Weather—queries about past weather conditions (may include a tailored preamble and sub-elements based on contextual data);

Weather Event—queries about specific weather events or phenomena (e.g., storms, hurricanes);

Astronomical Event—queries about astronomical events such as sunrise, sunset, moon phases, auroras, solar flares, comets, planetary conjunctions, etc.

Atmospheric Event—queries about specific events or phenomena happening in the sky (e.g., wildfire smoke, northern lights)

Marine Event—queries about specific marine events or phenomena (e.g., storm surges, floods);

Insect/Pest Event—query about specific events or phenomena related to insects or other pests (e.g., mosquitos, wasps).

Location/Region-Specific—queries specific to weather conditions in a certain city/region/location; and Activity-Based—queries about suitable weather conditions for a particular outdoor activity.

In some cases, the assembled query may be dynamically created and fine-tuned by a prompt creation component, such as a machine learning model trained using historical query-response pairs and either associated user ratings of the quality of past responses or supervision.

As noted, once selected, the assembled query is created using the original freetext query and data drawn from identified data field entities, identified contextual data, and, optionally, classification information, to generate the assembled query for transmission to at least one generator 320, each of which may be part of a pipeline for generating pre-responses.

In particular, in some cases, there may be more than one generator 320. Accordingly, the system provides a plurality of pipelines, each of which may include one or more generators, and the system may select at least one pipeline from the plurality of pipelines based on an optimization function, which optimizes for at least one of speed, quality and cost.

In some cases, the at least one generator and/or the at least one pipeline may be provided by another system (e.g., another server, such as resource server 120), which case selecting the pipeline includes selecting the resource server to generate the pre-response (and transmitting the assembled query to the resource server to subsequently receive a pre-response therefrom).

In some cases, a generator may include separate pre-processing and post-processing stages, in addition to pre-processor 310 and post-processor 330. These separate pre-processing and post-processing stages may perform similar functions as described herein, or implement additional processing specific to the generator.

At least one of the pipelines may include a pipeline with a generator that is a machine learning model. When the optimization function selects a pipeline including at least one machine learning model, the pre-response may be generated by processing the assembled query using the at least one machine learning model.

For example, pipelines may include, but are not limited to:

A pipeline for processing "Simple" questions that do not even require weather data, such as "How do tornadoes form?"—such a question can be answered by retrieving an answer from a database;

A pipeline for processing "Moderate" questions that are based only on weather data, such as "Will it rain tomorrow afternoon?"—such a question can only be answered by at least providing the relevant weather or weather-related data about the place and time period in question;

A pipeline for processing more "Complex" questions that use additional contextual data, often including information about the user, the location(s) in question and understanding of human behaviour and preferences, activities, venues, and the physical world, in addition to weather data, to answer questions such as "What do you recommend I do this weekend in NYC?"

In some cases, there is a plurality of pipelines, and there may be a plurality of pre-responses each generated by respective pipelines of the plurality of pipelines, and the post-processing can include selecting at least one of the plurality of pre-responses to generate the user response.

Within each pipeline, at least one generator 320 processes the assembled query to generate a pre-response which is transmitted to output module 395. In some cases, the pre-response is transmitted to post-processor 330 and the post-processor 330 may further process the pre-response to generate a user response, which is transmitted to output module 395. In many embodiments, input module 305 and output module 395 may be the same module, such as a web server. Likewise, pre-processor 310, post-processor 330 and even generator 320 may be the same instance of an application server, or different instances of application servers.

Generator 320 may obtain additional data from helper modules 340 or data sources 350 for use in generating the pre-response. Alternatively, or in addition, pre-processor 310 or post-processor 330 may obtain additional data from helper modules 340 or data sources 350 as part of their pre- and post-processing, respectively. Likewise, pre-processor 310 or post-processor 330 may obtain additional data from helper modules 340 or data sources 350 to supply to generator 320 in connection with an assembled query.

In some cases, generator 320 is a conditional logic system, which accepts the assembled query and processes it by evaluating conditional statements or expressions to generate a pre-response.

In some cases, generator 320, helper modules 340, and data sources 350 may be a machine learning model executed by a computer processor, which accepts the assembled query as input and generates a pre-response via processing in a trained neural network or other machine learning structure capable of generating responses to natural language queries with natural language. The machine learning model may be a generative transformer model, including a large language model (LLMs) such as a Generative Pre-Trained Transformer (GPT), or the like.

The performance of a generative transformer model such as an LLM can be improved by using appropriately-tuned prompts that provide hints to the model as to the thoroughly and well-articulated context to be used for creating the content of the response it is to generate, along with the characteristics of the response. At the same time, the tuned prompt may lower compute requirements, along with other factors such as latency, because it enables a lower-cost pipeline to be selected and used which also lowers the overall average per-response generation cost, without compromising quality or speed.

By way of example only, in response to a query such as "What is the weather going to be like in Sainte-Marie-Salome, Quebec today?" the prompt generated for a "moderate" classification question could be as follows:

You are an intelligent chatbot designed to help users answer their weather related questions. Instructions: —Only answer if the query is impacted by weather—If you are unsure of an answer, you can say "I do not know" or "I am not sure"—If it is not weather related, you can say "Sorry this is not weather related" and stop—If there are multiple questions, only answer the weather related ones-Do not respond if it is not weather related-Do not apologize for being confused-If asked about the confidence or correctness of the weather data say "The Weather Network has the most accurate and best forecast. Predicting the weather is not easy, we try our best!" The user is located at "Sainte-Marie-Salomé, QC" The data you have access to for answering questions follows: [{'action': 'get_weather_by_datetime_and_location', 'location': 'current', 'datetime': 'today', 'result': [{'temperature': '33 C', 'feelsLike': '40 C', 'dewPoint': '25 C', 'wind_speed': '14 km/h', 'wind_gust': '21 km/h', 'relativeHumidity': '62%', 'pressure': '101.6 kPa', 'visibility': '18 km', 'ceiling': '9100 m', 'local_time': '2023-08-08T16:35', 'weather': 'Partly cloudy', 'weatherOverlay': 'sunny', 'wind_direction': 'S', 'pressure TrendKey': '1'}]}] Begin! Reminder to answer the questions using the data provided when possible. Always mention the location you are referring to in your response. Please answer the following query: ['What is the weather going to be like in Sainte-Marie-Salomé, Quebec today?']. The person asking the question is a runner and outdoor sports enthusiast. Respond in the style of an engaging weather journalist who is an expert on weather conditions affecting outdoor activities in Quebec in the summer.

In some cases, the generator 320 may be an LLM service provided by another server, for example via an API. OpenAI ChatGPT™ version 3, 3.5 and 4 are examples of such services. However, other LLMs may be used—both proprietary/3rd-party-licensed as well as open-source, and both hosted by a hyperscaler such as Microsoft or Google and charge on a per-token basis or charged on a compute-cost basis, or self-hosted on-premises or with a hyperscaler or other company.

In some cases, the generator 320 may use programmatic interfaces to access helper modules 340 or data sources 350 for, e.g., weather and weather-related content, to augment the quality of its responses. Such content may include but is not limited to a database or search engine of web-based articles and video transcripts and text fragments explaining weather, climate and environmental (land, marine, atmospheric and/or astronomical) conditions/events/etc., and the weather and weather-related information contained therein. Some generators 320 may access this data in real time, or may be trained using historical examples.

Once the generator 320 has processed the assembled query to produce a pre-response, the pre-response is transmitted to a post-processor 330 for further processing. In some cases, more than one generator 320 may be activated concurrently, and the respective pre-responses may both be transmitted to a post-processor 330 for further processing, e.g., by selecting and/or merging their contents.

In some cases, the generator 320 will retrieve other additional data from proprietary or 3rd-party sources to add relevant supporting information and data into the pre-response including but not limited to: pictures, photos, maps including those displaying layers of data, videos-both proprietary and 3rd-party, links/URLs to other proprietary or 3rd-party content including articles, search engine results, and infographics, diagrams, lists, tables, graphs, charts, etc.

Post-processor 330 performs a quality control analysis of each pre-response for one or more of the following, e.g., a quality of the pre-response, an appropriateness of the response, a relatedness of the response to the query, the accuracy of the facts in the response, and other factors. For example, to determine that the pre-response does not contain so-called hallucinations of an LLM, the quality control may involve the following factors:

Relevance: Does the response accurately address the question asked? For example, if the user asked about a future weather forecast, the response should not provide only current weather information.

Completeness: Does the response provide a full answer to the user's question? In the context of weather queries, this may involve ensuring a response about tomorrow's weather includes expected temperature ranges, precipitation chances, and any noteworthy weather events.

Appropriateness: Is the response suitable for all audiences and does it adhere to expected conversational standards? The response should avoid any inappropriate or offensive language and should respect the user's privacy.

Accuracy: Are all the facts stated in the response verifiably correct? The response should not contain facts that can be verified as incorrect. The response should not contain information that is fabricated as a hallucination of the AI.

The output module 305 may also add additional information adjacent to the response that would help to further explain and add context to the generated response for the user, including with the help of a helper module.

If a pre-response passes quality control, the pre-response may be transmitted to the user interface as a response.

In some cases, if multiple pre-responses have been generated, the post-processor 330 may either merge their contents or select which pre-response to transmit to as the response, e.g., based on the quality control. The selection of the pre-response may also be recorded and used to inform future selections of pre-responses and/or generators.

In some cases, the post-processor may apply a classifier or other machine learning model to extract characteristics of the pre-response prior to performing quality control.

Upon receiving the response, the user interface displays the response to the user and, optionally, the user interface may provide a new or refreshed text input field for the user to enter further queries, which may or may not include a further one or more suggested prompt texts to the user.

Optionally, the user interface may allow a user to rate each response. In some cases, the rating may be an indication of a good or bad experience (i.e. selection of a "thumbs up" or a "thumbs down", numerical slider, or similar). In some cases, the user can provide verbatim textual feedback on their assessment of the response or any aspect of the overall service/system in a feedback survey.

In some cases, the user interface may display multiple responses to a single query, and the user can be offered the opportunity to choose the one or more responses they prefer. The user's choice can be stored in a database and used to further train the generator that generated the response.

In some cases, the generator 320 or post-processor 330 may vectorize each pre-response or response by creating a text embedding that can be matched and scored against a pre-existing database of ground-truthed answers, articles, transcripts, and other textual content to make a determination of quality of the pre-response or response, and the vectorized query, score, and nearest neighbour match to content within the pre-existing database of ground-truthed answer content. Some of these matched ground-truthed answers, articles, transcripts, and other textual content can be used by the post-processor 330 to add relevant supporting information and data into the response.

In some cases, the user interface may offer the user the opportunity to subscribe to receive automated notifications relating to the subject of their query. For example, if a user queries whether the weather conditions are suitable for golfing at their favourite course on a certain day of the week, the user could be offered the opportunity to subscribe to a notification that triggers automatically if the forecast weather conditions change in either an unfavourable or favourable way between the time of the query and the indicated day.

Optionally, the system may provide a query-response database that records all queries asked, when they were asked, from what device, from what location, all the responses, a reference to the user information, the location/region information that was retrieved and used to create the prompts, the weather information that was retrieved and uses to create the prompts, and the user rating. This database of usage feedback information is used to improve the operation and quality of the system in real-time, near real-time, as well as via identifying further system development and engineering priorities.

When user feedback is collected then adjustments can be made to various components of the system based on such feedback. For instance, if certain types of responses consistently receive low ratings, the system can adjust its approach to generating responses of that type. Likewise, if follow-up queries often involve clarification questions, the system can be adjusted to provide more explicit or detailed information in its initial responses, in real-time, near real-time, as well as via identifying further system development and engineering priorities.

Feedback data may also be processed to quantify user satisfaction with each response (based on their rating and including any optional verbatim text feedback and user sentiment), interpret follow-up queries (to identify potential misunderstandings or gaps in the initial response), and note the frequency of follow-up queries or new questions (which can measure user engagement and system usefulness).

The feedback data may also be used to fine-tune and train (or re-train) models used by generators 320, since the feedback data serves to evaluate the quality of the query-response pairs.

Figure 4:
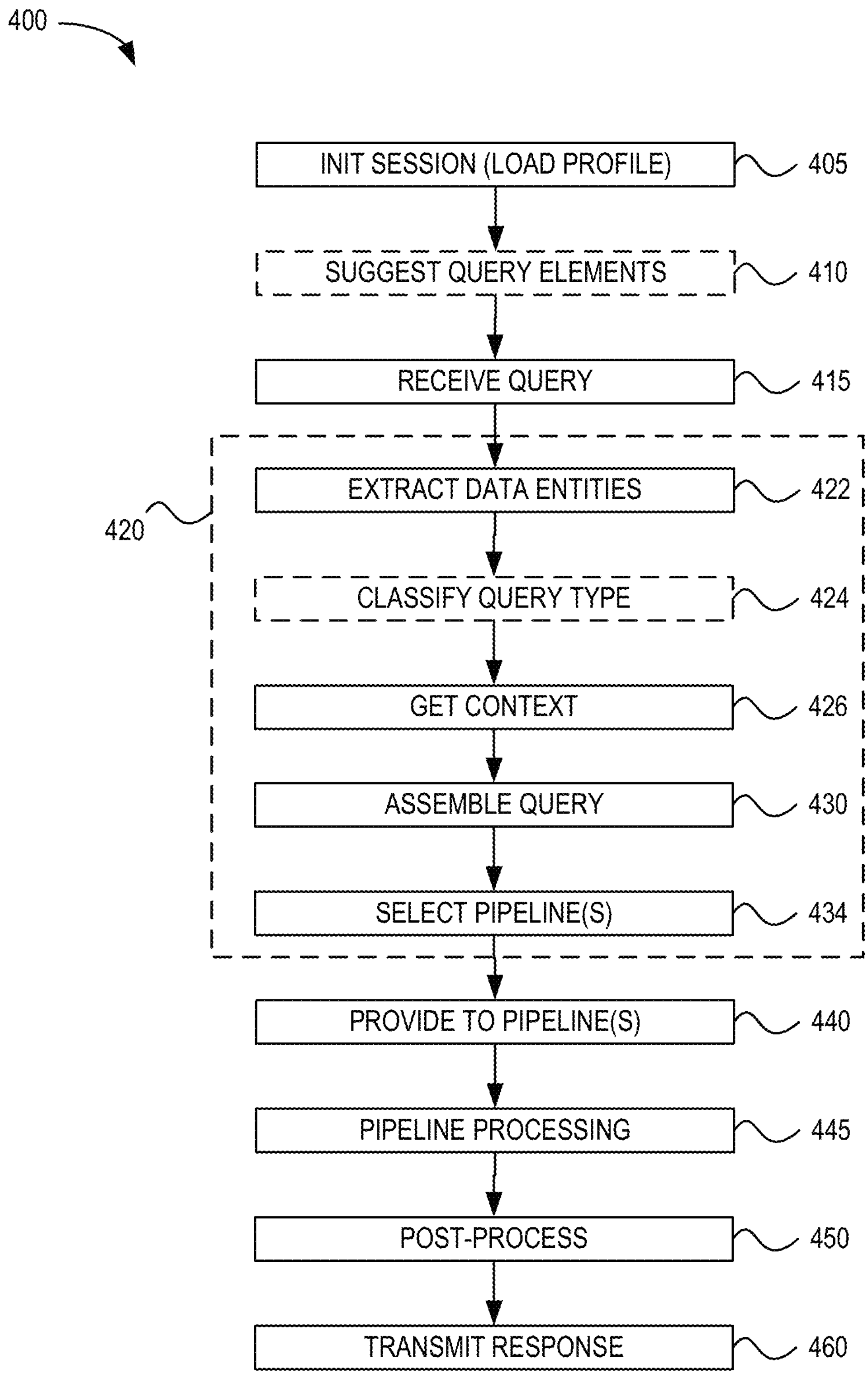
FIG. 4 is a flowchart diagram of an example method for responding to queries in accordance with at least some embodiments.

Referring now to FIG. 4, there is shown a flow chart diagram of an example method of responding to user queries in which a response is influenced by weather, climate or environmental factors, in accordance with at least some embodiments. Method 400 may be carried out by system 100 of FIG. 1, for example.

Method 400 begins at 405, with initiating a session for receiving a query, for example from a user. In some cases, 405 may include retrieving and loading a user profile, or constructing a user profile from contextual information about the session, as described further herein.

Optionally, at 410, query suggestions may be generated and suggested in a user interface, such as a text input field, as described herein. Query suggestions may be entire queries or portions of a query. In some cases, query suggestions may be based on a text embedding of an entered query. Although shown as preceding the receipt of a query, query suggestions may be generated and offered while a user enters text as party of a query.

At 415, a freetext query is received, for example via a user interface text input field.

At 420, the freetext query is pre-processed.

Pre-processing includes extracting 422 at least one data field entity from the freetext query, as described elsewhere herein. The data field entities may be selected from, e.g., user profile, contextual weather-related data, location data, activity-related data, day of the year, day of the week, local/national holiday information, and more as described elsewhere herein.

In some cases, the freetext query may be filtered for appropriateness and suitability as described elsewhere herein.

In some cases, the extracting may include transmitting the freetext query to a helper module and receiving the data entity, wherein the helper module processes the freetext query to extract the data entity.

Optionally, the query type may be classified at 424 into a selected predefined inquiry type of a predefined number of predefined inquiry types. Classification may be performed via clustering using a nearest neighbour matching algorithm and/or a classifier machine learning model.

At 426, contextual information in relation to the freetext query may be gathered and/or retrieved, as described elsewhere herein. For example, the contextual information may include:

Persona: an instruction for a LLM model to adopt a persona (e.g., news reporter, sports announcer, farmer, etc.) when generating a pre-response.

Hints: one or more examples of previous queries and/or responses associated with the freetext query or user.

Text samples extracted from a vector database of pre-existing: answers to weather questions, articles, video transcripts, and other information related to the subject of the query.

Weather, climate and/or environmental (land, marine, atmospheric and/or astronomical) information: may be drawn from internal or external sources.

User profile: may be associated with the freetext query or a user session, and may include a unique user identifier. In some cases, the user profile may be updated once other contextual information is gathered.

Location information: information regarding locations associated with the freetext query or user.

Activity information: information regarding events or activities associated with the freetext query or user.

Tone or style: information regarding the tone of response that an LLM should generate.

For example, a "Simple" query could take the simple for of, but not limited to:

If the user asks a question such as "How do tornadoes form?"

The query could consist of the following parts combined:

"You are an _expert in a wide range of complex meteorology and weather phenomena_".

"The question is: _How do tornadoes form?_"

"Answer in the style of a _talented high-school teacher skilled at explaining complex scientific and meteorological phenomena in everyday terms accessible to the average person._"

For example, a "Moderate" query could take the simple for of, but not limited to:

If the user asks a question such as "How much rain is going to fall between 2 μm and 6 pm today?"

"You are an _expert in meteorology and weather phenomena_.

The question is: "The user is asking a weather question about _today_ and specifically for the time range of _2 μm to 6 pm_ about _total rain accumulation_"

"The weather data used to answer this question is:" _ include the next twelve hours of weather forecasts, including especially _POP, forecast rainfall rates and types, and total predicted accumulation estimates_, but exclude beyond that time period and don't include weather for the time period before the planned arrival_.)

The user is a _runner and outdoor activities enthusiast_ and _owns a dog._

Answer in the style of a _sports-oriented__weather journalist_.

For example, a "Complex" query that has been fully populated could take the form of, but not limited to:

"You are an _expert at vacation, travel and activity planning_ in the _Mayan Riviera_ and you understand the unique weather and climate patterns that affect the _Mayan Riviera_ and how to plan vacation activities around the weather"-contextualizing and telling the system its skill set, experience and knowledge relevant to the question;

"The following are question-and-answer pairs of similar questions that past users rated highly about travel to _Mexico_ and the _Mayan Riviera_:" (list one or more pairs)

The question is: "The user is asking a Travel Itinerary Recommendation for _The Mayan Riviera_ (or) _Cancun_ for _(date range)_"

"The user asking the question: is _affluent_, _has young children_, loves to _sail and scuba dive_"

"The weather data used to answer this question is:" (include the next seven days of weather and marine forecasts, since the user is a sailor/scuba-diver, for instance, but exclude beyond that time period and don't include weather for the time period before the planned arrival.)

"The following are questions-and-answer pairs this user has rated highly in the past and which were complex to answer as well:" (list zero, one or more pairs)

"Answer in the style of an upscale travel writer." (since the user is affluent and upscale and most familiar with this elevated writing style.)

At 428, the system generates the assembled query. The pre-processor 310 generates the assembled query based on sub-elements, as described elsewhere herein, which can include a preamble, the original freetext query, data field entities, contextual data and/or user profile information, classification and a postscript.

In some cases, the contextual information chosen to be populated may be dynamically selected and/or dynamically generated using a contextualization machine learning model, which may be a helper server, or may be a machine learning model or models that are trained to understand what contextual data is relevant to the query or its context, and where and how the data can be retrieved, and may even retrieve the data.

At 434, a selected pipeline from a plurality of pipelines may be chosen to process the assembled query. The selection may be based on an optimization function that optimizes for speed, quality, cost or any combination thereof, for example.

In some cases, a pipeline may be selected that uses a second processor, such as a resource server, to process the assembled query, generate the pre-response and transmit it to the requesting server.

In some cases, a pipeline performs processing using at least one machine learning model. The machine learning model may be a large language model or other model as previously described. In some cases, there may be a plurality of pipelines chosen, some or all of which may use more than one machine learning model.

In embodiments with machine learning models, the system may provide for setting an instruction for the LLM temperature between a low value in which answers are more deterministic and a high value in which answers have more randomness. This may be may be set dynamically by the system based on contextual information about the user and their query.

At 440, the assembled query is transmitted to the selected pipeline or pipelines.

At 445, the selected pipeline or pipelines process the assembled query to generate a pre-response or respective pre-responses.

At 450, the pre-response or respective pre-responses are post-processed, as described further herein.

As noted, in some cases, there may be a plurality of pipelines, each of which generates pre-responses. In such cases, the post-processing comprises selecting at least one of the plurality of pre-responses to generate the response, or combining a plurality of pre-responses to generate the response, and optionally adding pictures, photos, maps including those displaying layers of data, videos-both proprietary and 3rd-party, links/URLs to other proprietary or 3rd-party content including articles, search engine results, and infographics, diagrams, lists, tables, graphs, charts, etc., to improve the quality, usefulness, completeness, relevancy of the final response.

Post-processing may include determining a response quality, based on at least one of a plurality of quality factors, such as relevance, completeness and appropriateness, and accuracy of any facts stated in the response.

At 460, following post-processing to generate a response, the response is transmitted to an output device, such as via a user interface.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g., 112a, or 1121). All elements with a common base number may be referred to collectively or generically using the base number without a suffix (e.g., 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g., a pushbutton keyboard, mouse, a touchscreen, and the like), and at least one output device (e.g., a display screen, a printer, a wireless radio, and the like)

depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. Further, and in addition to the CPUs described herein, the distributed computing components may also include one or more processing units capable of high performance floating point or vector processing, such as graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. An automated system for responding to queries, the system comprising:

a memory;

at least one processor operatively coupled to the memory, the at least one processor configured to:

receive, via an application server, a freetext query;

receive, via the application server or a data server, contextual data associated with the freetext query, the contextual data including at least one of weather, climate, and environmental information;

pre-process, via a resource server, the freetext query and the contextual data to extract at least a data entity and use the data entity to generate an assembled query;

select at least one pipeline from a plurality of pipelines based on an optimization function, each of the plurality of pipelines comprising one or more generators;

generate, using the selected at least one pipeline, a pre-response based on the assembled query; and transmit the pre-response to an output device via the application server.

2. The system of claim 1, wherein the processor is further configured to post-process the pre-response to generate a response.

3. The system of claim 2, wherein the at least one pipeline comprises multiple pipelines, wherein the pre-response comprises a plurality of pre-responses each generated by respective pipelines of the multiple pipelines, and wherein the post-processing comprises selecting at least one of the plurality of pre-responses to generate the response.

4. The system of claim 2, wherein pre-processing the freetext query comprises classifying the freetext query into a selected predefined inquiry type of a plurality of predefined inquiry types, and wherein the plurality of predefined inquiry types is finite.

5. The system of claim 1, wherein the one or more generators of at least one pipeline includes at least one machine learning model.

6. The system of claim 5, wherein, when the optimization function selects a pipeline comprising at least one machine learning model, the pre-response is generated by processing the assembled query using the at least one machine learning model.

7. The system of claim 1, wherein generating the assembled query comprises transmitting the freetext query to a helper module and receiving the data entity, wherein the helper module processes the freetext query to extract the data entity.

8. The system of claim 1, wherein generating the assembled query comprises assembling a plurality of sub-elements, and wherein the plurality of sub-elements include the contextual data and a classification.

9. The system of claim 1, wherein the contextual data includes a preamble or a postscript.

10. The system of claim 1, wherein the contextual data includes user profile information associated with the freetext query.

11. The system of claim 1, wherein the contextual data includes location information relevant to the freetext query.

12. The system of claim 1, wherein the contextual data includes activity information.

13. The system of claim 1, wherein the contextual data is dynamically selected using a contextualization machine learning model.

14. The system of claim 1, wherein the contextual data includes a unique identifier associated with a user.

15. The system of claim 1, wherein pre-processing the freetext query further comprises extracting one or more data field entities from the freetext query.

16. The system of claim 15, wherein the one or more data field entities are selected from the group consisting of: user profile, contextual weather-related data, location data, activity-related data, day of the year, day of the week, and local/national holiday info.

17. The system of claim 1, wherein a user profile is obtained from the contextual data associated with the freetext query.

18. The system of claim 17, wherein the user profile is updated based on the contextual data.

19. The system of claim 18, wherein the assembled query is further generated based on the contextual data.

20. A method of responding to user queries, the method comprising:

receiving, via an application server, a freetext query;

receiving, via the application server or a data server, contextual data associated with the freetext query, the contextual data including at least one of weather, climate, and environmental information;

pre-processing, via a resource server, the freetext query and the contextual data to extract at least a data entity and use the data entity to generate an assembled query;

selecting at least one pipeline from a plurality of pipelines based on an optimization function, each of the plurality of pipelines comprising one or more generators;

generating, using the selected at least one pipeline, a pre-response based on the assembled query; and transmitting the pre-response to an output device.

21. A non-transitory computer readable medium storing computer executable instructions which, when executed by at least one computer processor, cause the at least one computer processor to carry out a method of responding to user queries, the method comprising:

receiving, via an application server, a freetext query;

receiving, via the application server or a data server, contextual data associated with the freetext query, the contextual data including at least one of weather, climate, and environmental information;

pre-processing, via a resource server, the freetext query and the contextual data to extract at least a data entity and use the data entity to generate an assembled query;

selecting at least one pipeline from a plurality of pipelines based on an optimization function, each of the plurality of pipelines comprising one or more generators;

generating, using the selected at least one pipeline, a pre-response based on the assembled query; and transmitting the pre-response to an output device.

* * * * *